United States Patent
Wang et al.

(10) Patent No.: US 12,011,652 B2
(45) Date of Patent: Jun. 18, 2024

(54) FLOOR-TYPE GOLF BALL DETECTION METHOD, SYSTEM AND STORAGE MEDIUM

(71) Applicant: SHENZHEN GREENJOY TECHNOLOGY CO., LTD., GuangDong (CN)

(72) Inventors: Ji Jun Wang, GuangDong (CN); Qing Hua Wang, GuangDong (CN)

(73) Assignee: SHENZHEN GREENJOY TECHNOLOGY CO., LTD., GuangDong (CN)

( * ) Notice: Subject to any disclaimer, the term of this patent is extended or adjusted under 35 U.S.C. 154(b) by 483 days.

(21) Appl. No.: 17/499,883

(22) Filed: Oct. 13, 2021

(65) Prior Publication Data
US 2022/0088461 A1    Mar. 24, 2022

Related U.S. Application Data

(63) Continuation of application No. PCT/CN2020/131288, filed on Nov. 25, 2020.

(30) Foreign Application Priority Data

Sep. 22, 2020    (CN) .......................... 202010999663.4

(51) Int. Cl.
     *A63B 71/06*          (2006.01)
     *A63B 69/36*          (2006.01)

(52) U.S. Cl.
     CPC ...... *A63B 71/0622* (2013.01); *A63B 69/3658* (2013.01); *A63B 2071/0638* (2013.01); *A63B 2220/34* (2013.01); *A63B 2220/806* (2013.01)

(58) Field of Classification Search
     CPC ............ A63B 71/0622; A63B 69/3658; A63B 2071/0638; A63B 2220/34;
(Continued)

(56) References Cited

U.S. PATENT DOCUMENTS

| 10,217,228 B2 * | 2/2019 | Suk ........................... G06T 7/35 |
| 2004/0032970 A1 * | 2/2004 | Kiraly ................ A63B 24/0021 |
| | | 382/103 |

(Continued)

FOREIGN PATENT DOCUMENTS

| CN | 103442773 | | 12/2013 | |
| CN | 103442773 A | * | 12/2013 | ............. A63B 67/02 |

(Continued)

OTHER PUBLICATIONS

Wu Teng-Teng et al., "Application of Minimum Fuzzy Entropy Segmentation Method to Oil Spill Detection in SAR Imagery", Remote Sensing Information, Apr. 2015, submit with English abstract, pp. 1-6.

(Continued)

*Primary Examiner* — Jeffrey S Vanderveen
(74) *Attorney, Agent, or Firm* — Cooper Legal Group, LLC

(57) ABSTRACT

The present application discloses a golf ball floor type detection method, a system, and a storage medium. The method includes the following steps: correcting distortion of the camera; calibrating a camera; triggering of hitting a ball: monitoring a pixel variation value of a serving position of a golf ball in a picture captured by the camera in real time, and determining triggering of hitting a ball when the pixel variation value of the position exceeds a threshold value; positioning a golf ball: processing the picture captured by the camera after triggering of hitting a ball with a dynamic segmentation based on a fuzzy entropy, and positioning the processed picture to acquire coordinate data of the golf ball; calculating parameters; and detecting a rotating speed of the golf ball.

8 Claims, 12 Drawing Sheets

(58) Field of Classification Search
CPC .......... A63B 2220/806; A63B 24/0021; A63B 71/04; A63B 2024/0028; A63B 2102/32; A63B 2220/30; G06T 3/047; G06T 7/11; G06T 7/194; G06T 7/80; G06T 2207/10016; G06T 2207/30204; G06T 2207/30224; G06T 2207/30241; G06T 7/246; G06T 7/12; G06T 7/10; G06T 7/181; G06T 7/73; G06T 2207/30221; G01P 3/36; H04N 23/81

See application file for complete search history.

(56) References Cited

U.S. PATENT DOCUMENTS

| | | | | |
|---|---|---|---|---|
| 2005/0172695 | A1* | 8/2005 | Furze | G01B 21/042 73/1.01 |
| 2013/0039538 | A1* | 2/2013 | Johnson | G06T 7/20 382/103 |
| 2015/0356748 | A1* | 12/2015 | Kim | H04N 13/239 382/154 |
| 2016/0320476 | A1* | 11/2016 | Johnson | G06T 7/20 |

FOREIGN PATENT DOCUMENTS

| | | | | |
|---|---|---|---|---|
| CN | 107239748 | | 10/2017 | |
| CN | 107239748 A | * | 10/2017 | ......... G06K 9/00671 |
| CN | 107543530 | | 1/2018 | |
| CN | 107543530 A | * | 1/2018 | ......... A63B 69/3661 |
| CN | 110787433 | | 2/2020 | |
| CN | 110787433 A | * | 2/2020 | |
| CN | 110787433 A | | 2/2020 | |
| CN | 111097155 | | 5/2020 | |
| CN | 111097155 A | * | 5/2020 | ......... A63B 24/0021 |
| EP | 2032220 B1 | * | 10/2013 | ......... A63B 24/0003 |
| EP | 2032220 B1 | | 10/2013 | |
| JP | 2001521403 A | * | 11/2001 | |

OTHER PUBLICATIONS

Wang Shaobo, et al; "Tracking a Golf Ball with High-Speed Stereo Vision System"; vol. 68, No. 8; Aug. 1, 2019; pp. 2742-2754.

Zhang Yifeng, et al; "Real-Time Spin Estimation of Ping-Pong Ball Using Its Natural Brand"; vol. 64, No. 8; Aug. 1, 2015; pp. 2280-9456.

European Patent Office; European Search Report; May 23, 2022; 4 pages.

* cited by examiner before correcting      After fitting and correcting

FLOOR-TYPE GOLF BALL DETECTION METHOD, SYSTEM AND STORAGE MEDIUM

CROSS-REFERENCE TO RELATED APPLICATION

The present application is a continuation of international application of PCT application No. PCT/CN2020/131288 filed on Nov. 25, 2020, which claims the priority benefit of China application No. 202010999663.4 filed on Sep. 22, 2020. The entirety of the above-mentioned patent applications is incorporated herein by reference and made a part of this specification.

TECHNICAL FIELD

The present application relates to the technical field of golf simulation technology, in particular to a golf ball floor type detection method, a system, and a storage medium.

BACKGROUND ART

A golf system includes a hitting zone, a sensor, a computing unit, and a display screen. The golf system may be used in indoor golf or outdoor golf sports.

When a user hits a golf ball in the hitting zone, the sensor collects the hitting information and movement information of the golf ball, and the computing unit simulates the movement track of the golf ball according to the information and displays the movement track on the display screen. The sensor may be an image sensor or a phototonus sensor, or the like. When the image sensor is used, the image information needs to be analyzed and processed to obtain the movement variation information of the golf ball to simulate its movement track.

However, the current golf system does not environmentally adapt a picture when processing the picture collected by the image sensor, thereby affecting the positioning accuracy in the golf positioning procedure.

Therefore, the prior art still needs to be improved.

SUMMARY

In view of the above-mentioned deficiencies in the prior art, an object of the present application is to provide a golf ball floor type detection method, a system, and a storage medium for improving the positioning accuracy of a golf system during the positioning processing procedure.

In order to achieve the above object, the present application adopts the following technical solutions.

In the first aspect, the present application provides a golf ball floor type detection method, which is applied to a golf system with a camera configured at the side for detecting the golf ball, wherein a mark is arranged on the golf ball. The detection method includes:

S10, correcting distortion of the camera: correcting a distorted image coordinate system of a camera by performing a polar coordinate transformation;

S20, calibrating a camera: converting the corrected image coordinate system into a world coordinate system;

S30, triggering of hitting a ball: monitoring a pixel variation value of a serving position of a golf ball in a picture captured by the camera in real time, and determining triggering of hitting a ball when the pixel variation value of the position exceeds a threshold value;

S40, positioning a golf ball: processing the picture captured by the camera after triggering of hitting a ball with a dynamic segmentation based on a fuzzy entropy, and positioning the processed picture to acquire coordinate data of the golf ball;

S50, calculating parameters: substituting the coordinate data of the golf ball obtained by the positioning into a world coordinate system to calculate movement parameters of the golf ball; and S60, detecting a rotating speed of the golf ball: extracting a mark on the golf ball in the picture used for positioning by performing a gradient-based dynamic segmentation method, and acquiring the rotating speed based on angular variation of the extracted mark in the picture.

In the second aspect, the present application provides a golf simulation system. The system includes a memory, a processor, and a computer program stored in the memory and configured to be executed by the processor, wherein the processor is configured to execute the computer program for implementing the method described above.

In the third aspect, the present application provides a computer-readable storage medium having a computer program stored thereon, wherein, the computer program is executed to implement the method described above.

In the golf ball floor type detection method according to embodiment of the present application, by correcting the distortion of the camera and combining with the dynamic segmentation based on fuzzy entropy during the positioning, the picture processing can adapt to the changes in an ambient light and improve the positioning accuracy. Meanwhile, by determining triggering of hitting a ball, after the coordinate of the serving position of the golf ball is obtained, the position monitoring is no longer to be performed. Instead, the pixel variation value at the serving position of the golf ball is monitored in real time. Therefore, replacing coordinate positioning with pixel monitoring can increase the response speed of the golf system.

BRIEF DESCRIPTION OF THE DRAWINGS

In order to illustrate the embodiments of the present application or the technical solutions in the prior art more clearly, the following will briefly introduce the drawings that need to be used in the description of the embodiments or the prior art. Obviously, the drawings in the following description are merely some embodiments of the present application. For those of ordinary skills in the art, other drawings can be obtained according to the structure shown in these drawings without involving inventive efforts.

DETAILED DESCRIPTION

The technical solutions in the embodiments of the present application will be clearly and completely described below in conjunction with the accompanying drawings in the embodiments of the present application. Obviously, the described embodiments are only a part of the embodiments of the present application, rather than all the embodiments. Based on the embodiments of the present application, all other embodiments obtained by one of ordinary skills in the art without involving any inventive effort are within the scope of the present application.

The present application provides a golf ball floor type detection method, which is applied to a golf system with a camera arranged on the side for detecting the movement state of a golf ball, on which a mark is arranged.

A golf system with a camera arranged on the side, i.e., a golf system with a floor-type camera, captures picture of a golf ball with a perspective from the side. The golf system with the floor-type camera is suitable for detecting the movement state of the golf ball in the medium-low performance golf system with low resolution.

In order to meet the requirement that the floor-type camera can acquire more data, the lens of the golf system of the type generally adopts a wide-angle lens. However, the wide-angle lens has fisheye distortion and must be corrected. Thus, when a golf ball is shot with a perspective from the side, the human body and the golf ball will be overlapped, thus presenting strong interference. Therefore, according to the present application, the golf system configured with the camera on the side is suitable for a method of detecting the movement of the golf ball below to improve the response speed of the system.

Figure 1:
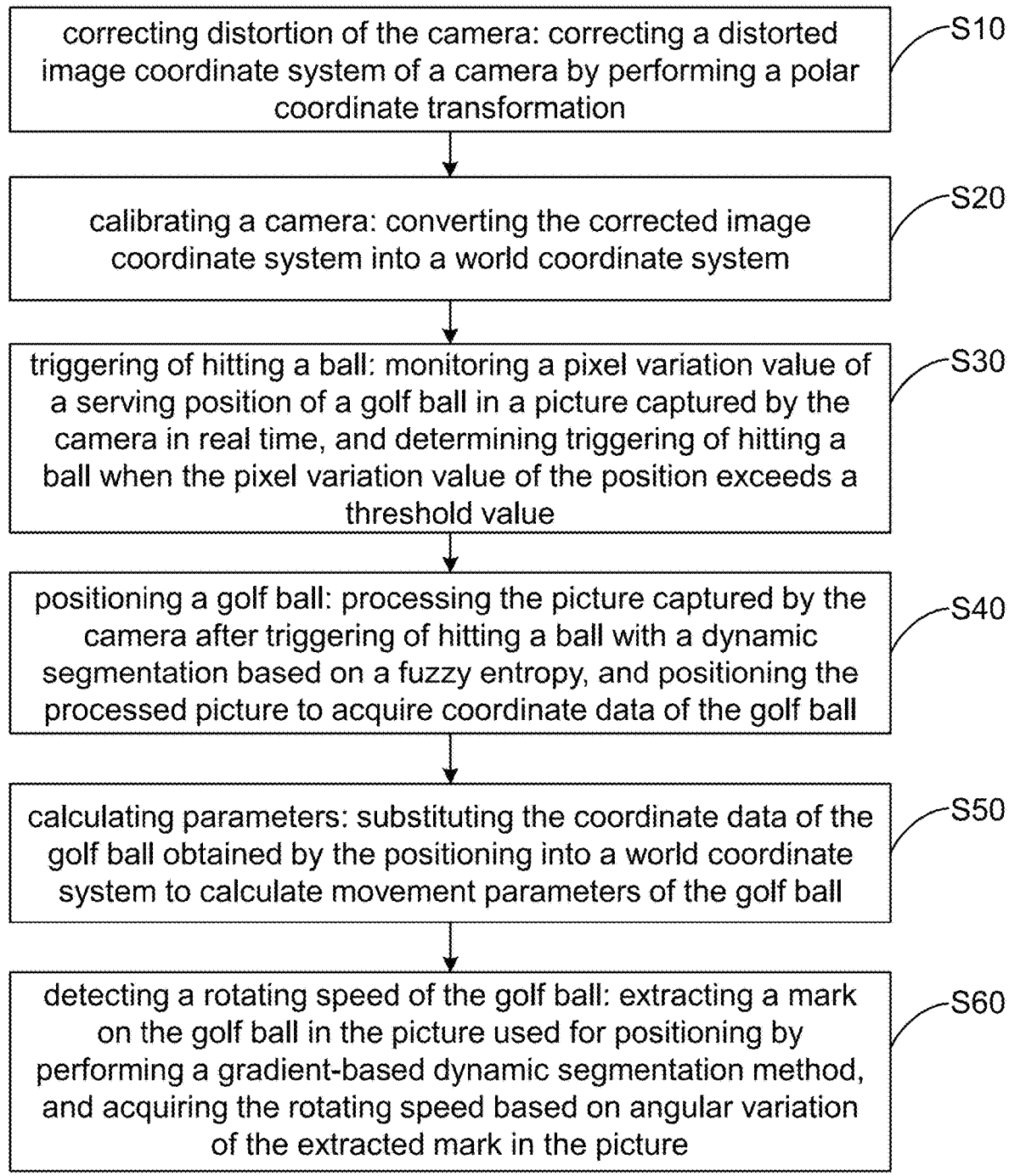
FIG. 1 is a schematic flow diagram of a golf ball floor type detection method according to a first embodiment of the present application.

As shown in FIG. 1, it is a flow diagram of a golf ball floor type detection method according to the present application, including steps as follows.

S10, correcting distortion of a camera: correcting a distorted image coordinate system of a camera by performing a polar coordinate transformation.

Because the wide-angle camera has a fisheye distortion, as a matter of experience, the distortion will cause different precisions in converting coordinates of different positions during the imaging into world coordinates, which is directly manifested as a slower ball speed of a long club than the actual one, and thus is required to be corrected. Because the lens specification is fixed, a fixed geometric transformation is used for quickly correcting the distorted coordinate to enable it to return to the perspective principle.

In an embodiment of the present application, a distorted image coordinate system of a camera is corrected by performing a polar coordinate transformation based on the following correcting formula:

$$phi = a\tan 2(y,x);$$

$$DST = L/(r_2 - dst^2)^{0.5} \times dst;$$

wherein:

$$a\tan 2(y,x) = \begin{cases} \arctan\left(\frac{y}{x}\right) & x > 0 \\ \arctan\left(\frac{y}{x}\right) + \pi & y \geq 0, x < 0 \\ \arctan\left(\frac{y}{x}\right) - \pi & y < 0, x < 0 \\ +\frac{\pi}{2} & y > 0, x = 0 \\ -\frac{\pi}{2} & y < 0, x = 0 \\ 0 & y = 0, x = 0 \end{cases}$$

phi is a azimuth angle, x and y are coordinates in an image coordinate system, DST and dst respectively are radius lengths of an output plane and an image plane on a polar coordinate system, r is a physical radius length of the lens of the camera, and L is a scaling factor.

In such a way, the corrected coordinate system can be solved by using the polar coordinate system of the correcting formula such that the problem of image distortion is solved and the image precision is improved.

S20, calibrating a camera: converting the corrected image coordinate system into a world coordinate system.

In the procedure of image processing, in order to determine a relationship between a three-dimensional geometric position of a point on a surface of a spatial object and its corresponding point in the image, a geometric model of camera imaging must be established. Under most conditions, these parameters must be obtained through experiments and calculations. The procedure for solving parameters is referred to as camera calibration. Camera calibration is an implementation procedure of converting the mathematical meaning of a real image into computationally operable digitalization.

The calibration of a camera can affect the follow-up calculation precision and avoid the gradually increasing accumulation of errors in the algorithm. It is the key to achieve the effective calculation of a target object.

According to the present application, in the calibration procedure, a fixed number of calibration blocks with a fixed position, different heights, and uniform distribution are adopted. The distribution of the calibration blocks is designed with the highest efficiency based on experiments. The calibration blocks are only required to be calibrated once because the placed calibration blocks contain height information.

The camera according to the present application may be a monocular camera or a binocular camera. In a case of a binocular camera, each camera is independently calibrated.

Figure 2:
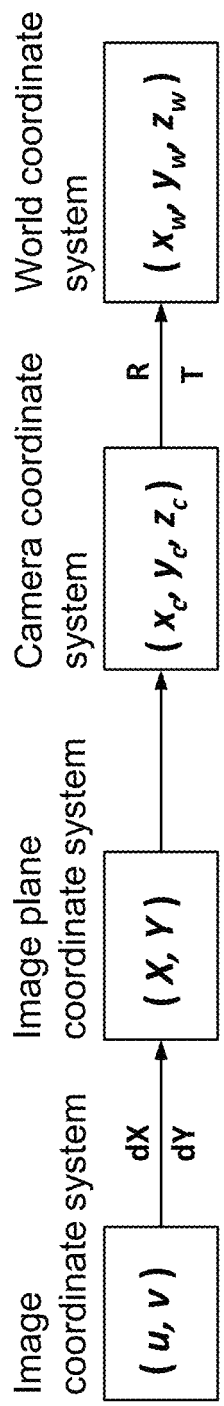
FIG. 2 is a schematic view showing a conversion procedure between an image coordinate system and a world coordinate system according to the present application.

As shown in FIG. 2, the procedure of converting the corrected image coordinate system into the world coordinate system according to the present application includes converting the image coordinate system into an image plane coordinate system, then converting the image plane coordinate system into a camera coordinate system, and then converting the camera coordinate system into the world coordinate system.

In an example of the present application, the corrected image coordinate system of the camera is converted into the world coordinate system based on the following conversion formula:

$$s\begin{bmatrix} u \\ v \\ 1 \end{bmatrix} = M_1 M_2 \begin{bmatrix} x_w \\ y_w \\ z_w \\ 1 \end{bmatrix} = \begin{bmatrix} m_{11} & m_{12} & m_{13} & m_{14} \\ m_{21} & m_{22} & m_{23} & m_{24} \\ m_{31} & m_{32} & m_{33} & m_{34} \end{bmatrix} \begin{bmatrix} x_w \\ y_w \\ z_w \\ 1 \end{bmatrix} = M \begin{bmatrix} x_w \\ y_w \\ z_w \\ 1 \end{bmatrix},$$

wherein, $M_1$ is an internal reference matrix of the camera, $M_2$ is an external reference matrix of the camera, and in $M_1 \times M_2 = M$, M is a mapping matrix.

When the camera according to the present application is a binocular camera, each camera of the binocular camera is calibrated to obtain a mapping matrix M, and the coordinate and matrix of the binocular camera are substituted to simultaneously solve the world coordinate.

S30, triggering of hitting a ball: monitoring a pixel variation value of a serving position of a golf ball in a picture captured by the camera in real time, and determining triggering of hitting a ball when the pixel variation value of the position exceeds a threshold value.

By determining the triggering of hitting a ball, positioning processing on each frame picture before a ball is served can be avoided, such that the amount of picture processing in the system is reduced, and the response processing speed of the system is improved.

Before a ball is hit, the camera firstly captures a picture, and performs a preliminary positioning on the picture to acquire the coordinate of the golf ball at the serving position. After acquiring the coordinate of the serving position of the golf ball, according to the present application, the variation of the coordinate position of the golf ball is no longer monitored before the ball is served; instead, the pixel variation value at the serving position of the golf ball is monitored in real time. Because the monitoring of the variation of the coordinate position of the golf ball requires a global positioning on the entire picture, and the pixel monitoring only requires processing on the picture at the serving position of the golf ball, and thus the processing area and content of the picture are reduced. Therefore, replacing of coordinate positioning with pixel monitoring can enhance the response speed of the golf system.

S40, positioning a golf ball: processing the picture captured by the camera after triggering of hitting a ball with a dynamic segmentation based on a fuzzy entropy, and positioning the processed picture to acquire the coordinate data of the golf ball.

Because the golf system is configured with the camera at the side, the human body will overlap with the golf ball which causes a significant interference. Accordingly, the processing of pictures requires adapting to changes in the environment, such as changes in the target and the interfering object; the changes may involve brightness, shape, and the like.

According to the present application, the picture is processed with a dynamic segmentation based on fuzzy entropy, which can adapt to changes in the environmental in the foreground and background, and thus accurately separating out the desired target and improving the positioning accuracy.

S50, calculating of parameters: substituting the coordinate data of the golf ball obtained by the positioning into the world coordinate system to calculate movement parameters of the golf ball.

Figure 3:
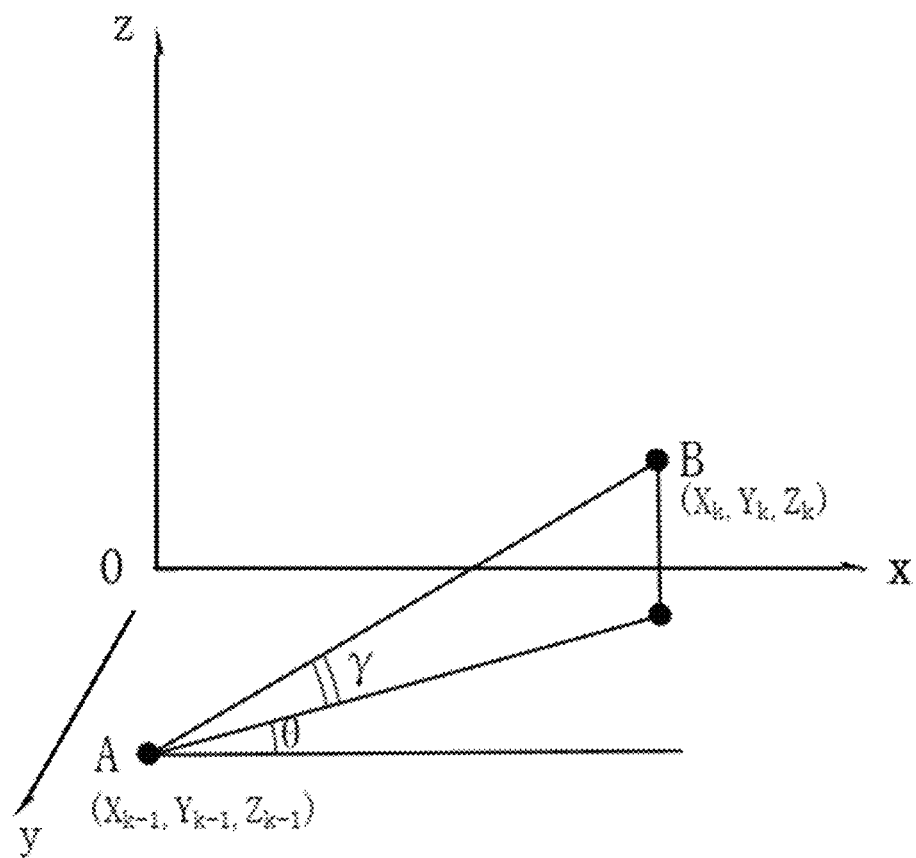
FIG. 3 is a schematic view showing the calculation of a golf ball movement parameter according to the present application.

As shown in FIG. 3, movement parameters can be calculated by converting the coordinate obtained by the positioning in step S40 into a world coordinate. The movement parameters include parameters such as a ball speed, a crab angle, a take-off angle, and the like; $\theta$ is the crab angle, $\gamma$ is the take-off angle, and V is the spatial ball speed.

S60, detecting of the rotating speed of the golf ball: extracting a mark on the golf ball in the picture used for positioning by performing a gradient-based dynamic segmentation method, and acquiring the rotating speed based on the angular variation of the extracted mark in the picture.

According to the present application, a mark is arranged on the golf ball in advance such that the rotating speed can be calculated according to the angular variation of the mark in the picture.

Because the distribution of brightness in the foreground is uneven and the brightness variation of each frame is large, it is quite difficult to extract a mark on the golf ball from the picture at a low resolution, which is not suitable for gray value segmentation. In the present application, the gradient-based dynamic segmentation method can accurately extract the mark on the golf ball from pictures at a low resolution, such that the subsequent rotation detection can be ensured.

With the parameter calculation in step S50, after converting the coordinate obtained by the positioning into a world coordinate, parameters such as the ball speed, the crab angle, the take-off angle, and the like can be calculated. The rotating speed of the golf ball is obtained with combining step S60, and then the complete movement track of the golf ball after hitting the ball and the rotational state of the golf ball on the track can be simulatively calculated. In the present application, the detection and simulation are typically carried out separately, and the simulation is typically completed by the client.

Figure 4:
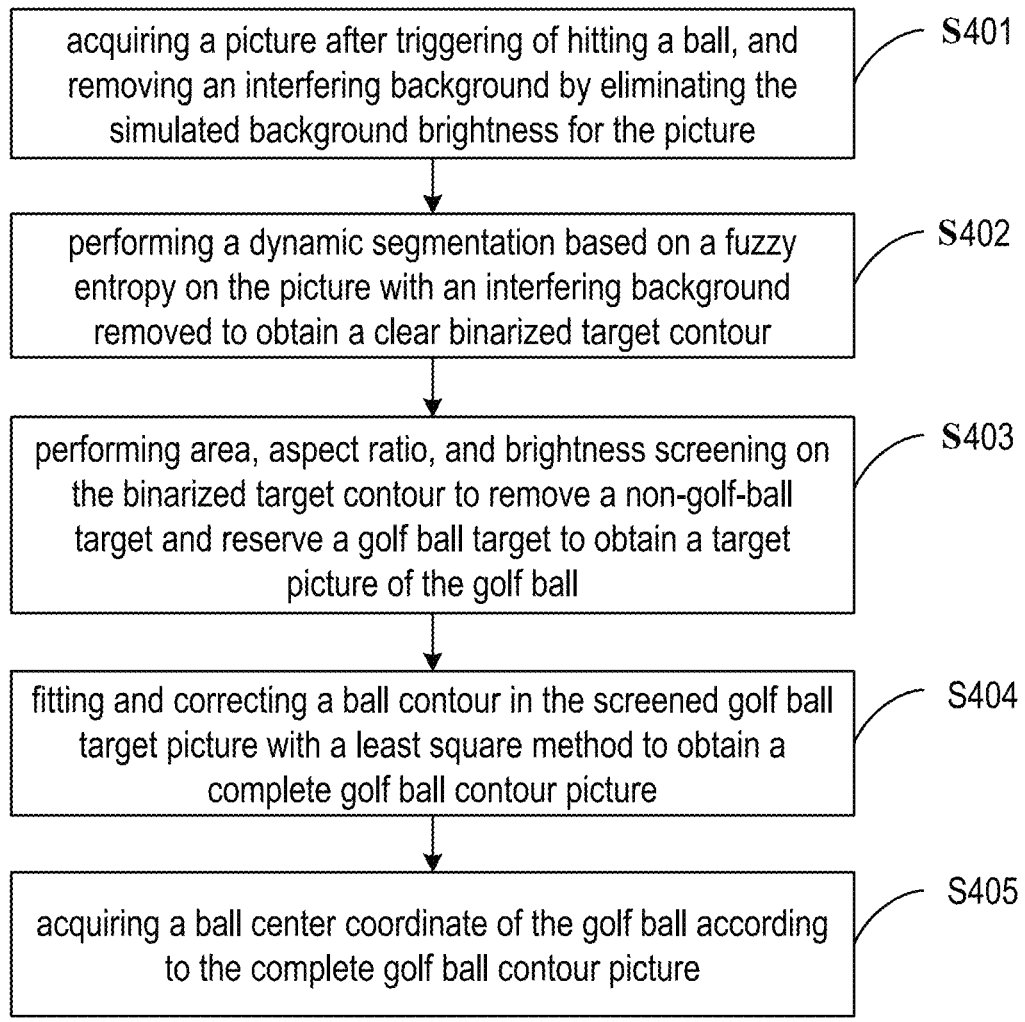
FIG. 4 is a schematic flow diagram of positioning a golf ball according to the first embodiment of the present application.

Specifically, as shown in FIG. 4, according to the present application, positioning a golf ball: processing the picture captured by the camera after triggering of hitting a ball with a dynamic segmentation based on a fuzzy entropy, and positioning the processed picture to acquire the coordinate data of the golf ball includes the following steps.

S401, acquiring a picture after triggering of hitting a ball, and removing an interfering background by eliminating the simulated background brightness for the picture.

Figure 5:
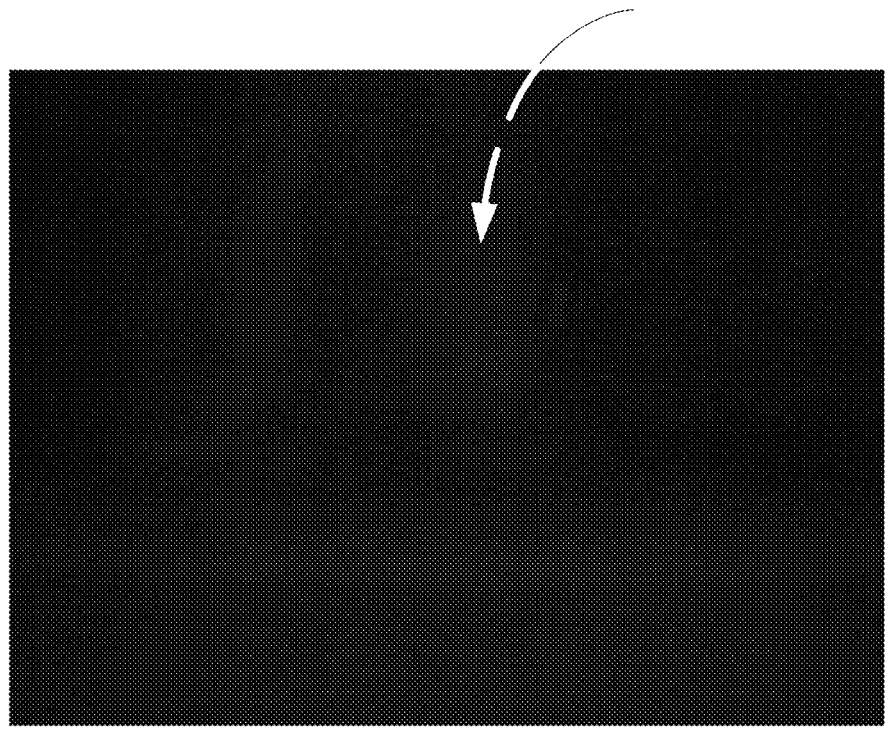
FIG. 5 is a schematic view of simulated background brightness in the positioning according to the present application.
Figure 6:
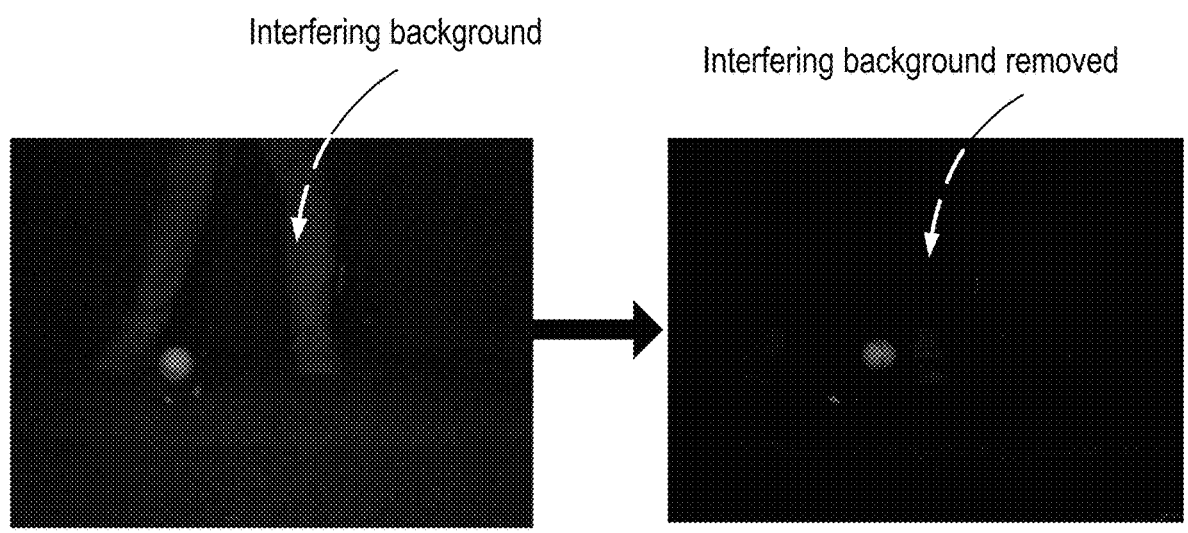
FIG. 6 is a schematic view of a procedure for removing interfering background by eliminating simulated background brightness in the positioning according to the present application.

As shown in FIG. 5, the brightness of the environment background of the picture is simulated, and then the simulated background brightness is removed from the original picture. As shown in FIG. 6, the left is an original picture in which there is an apparent interfering background of legs of a human body, and then with excluding the simulated background brightness in the picture, the picture on the right is obtained, in which the interfering background has been removed in the right picture.

S402, performing a dynamic segmentation based on a fuzzy entropy on the picture with an interfering background removed to obtain a clear binarized target contour.

When the distance between the ball and the camera changes after the ball is hit, the brightness of the surface of the ball changes in a large interval (about [40-120]). With dynamic changes in the brightness, the dynamic segmentation based on fuzzy entropy can adapt to the changes in the picture environment after the distance between the ball and the camera changes after the ball well such that the target in the picture can be accurately segmented out.

In an embodiment according to the present application, a segmentation value of the fuzzy entropy dynamic segmentation is calculated based on the following formula:

$$u = \frac{1}{1 + \frac{|v-m|}{255}}; \text{entropy} = \frac{u}{\log_{10}(u)} - \frac{1-u}{\log_{10}(1-u)};$$

wherein, u is a degree of membership, m is a feature value based on a gray value, v is a pixel value, and entropy is a fuzzy entropy.

The pixels in the range of pixels conforming to the above formula are respectively substituted into the above formula to solve the fuzzy entropy of the foreground and background, and a minimum value is selected as an optimal segmentation value. Finally, a binarization picture with a clear target contour is obtained.

Figure 7:
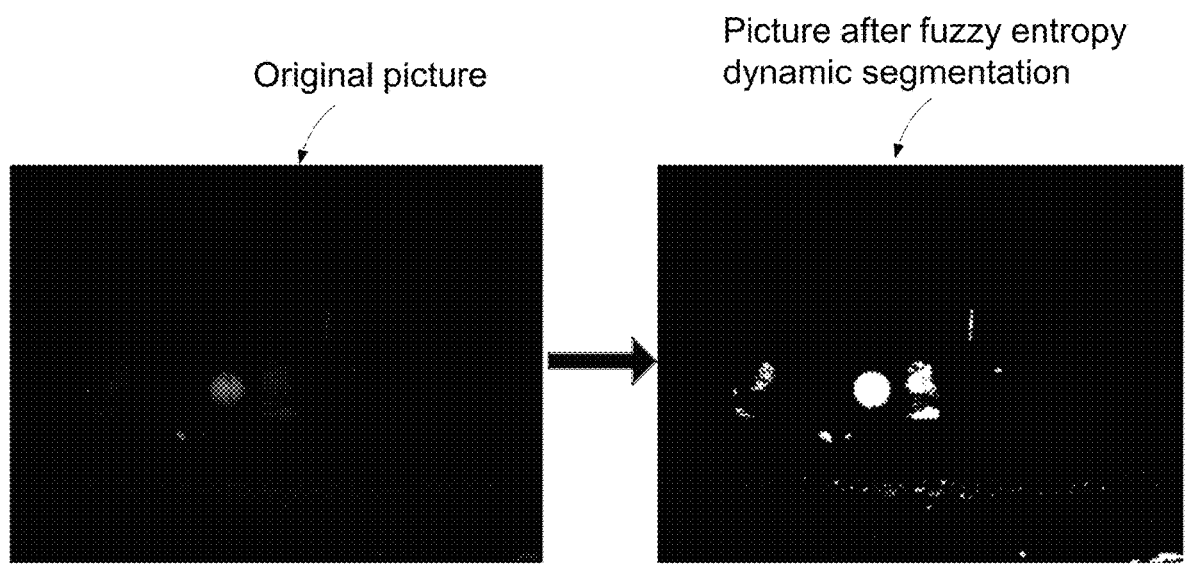
FIG. 7 is a schematic view of a procedure for obtaining a target contour from the original picture after fuzzy entropy dynamic segmentation in the positioning according to the present application.

As shown in FIG. 7, according to the present application, a fuzzy entropy dynamic segmentation processing is performed on the original picture captured by the camera after the ball is hit to obtain the picture on the right side in FIG. 7, and all parts of the middle and the edge of the target object at the moment are highlighted such that the clear contour of the target is obtained.

S403, performing area, aspect ratio, and brightness screening on the binarized target contour to remove a non-golf-ball target and reserve a golf ball target to obtain a target picture of the golf ball.

The step is used to remove non-golf-ball impurities in the picture, such as the club head, other reflections, and like shapes in the picture. Because golf balls have specific features such as area, aspect ratio, brightness, etc., these features can be screened.

Figure 8:
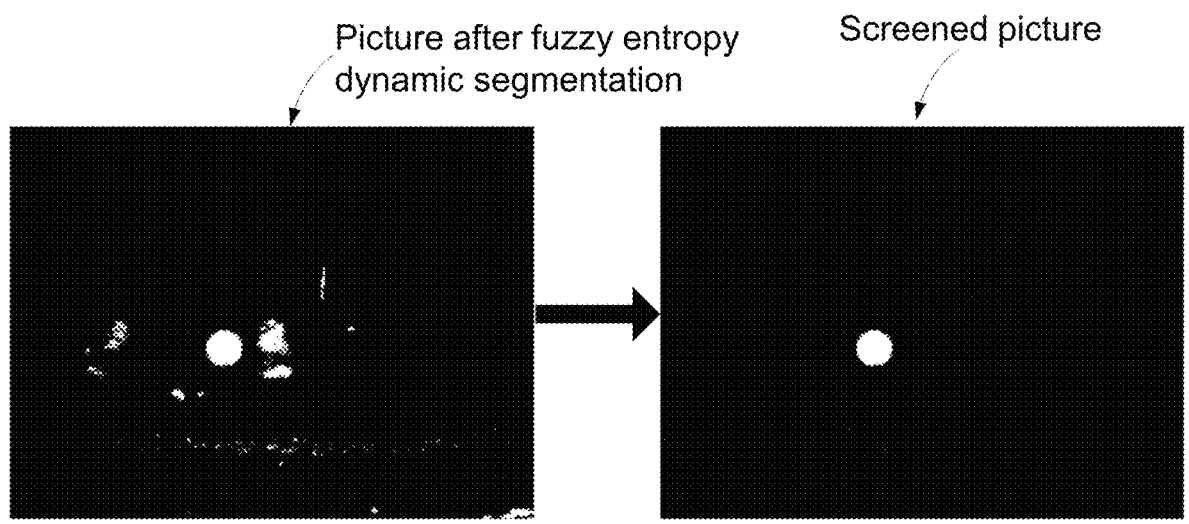
FIG. 8 is a schematic view of a target contour after a procedure for performing an area, aspect ratio, and brightness screening in the positioning according to the present application.

As shown in FIG. 8, the figure at the left side is a binarized target contour picture obtained with a dynamic segmentation based on fuzzy entropy, in which impurities in the shape of a non-golf-ball exist, and then the figure at the right side in FIG. 8 is obtained by performing area, aspect ratio and brightness screening in sequence, at which time the impurities are removed from the picture.

S404, fitting and correcting a ball contour in the screened golf ball target picture with a least square method to obtain a complete golf ball contour picture.

Figure 9:
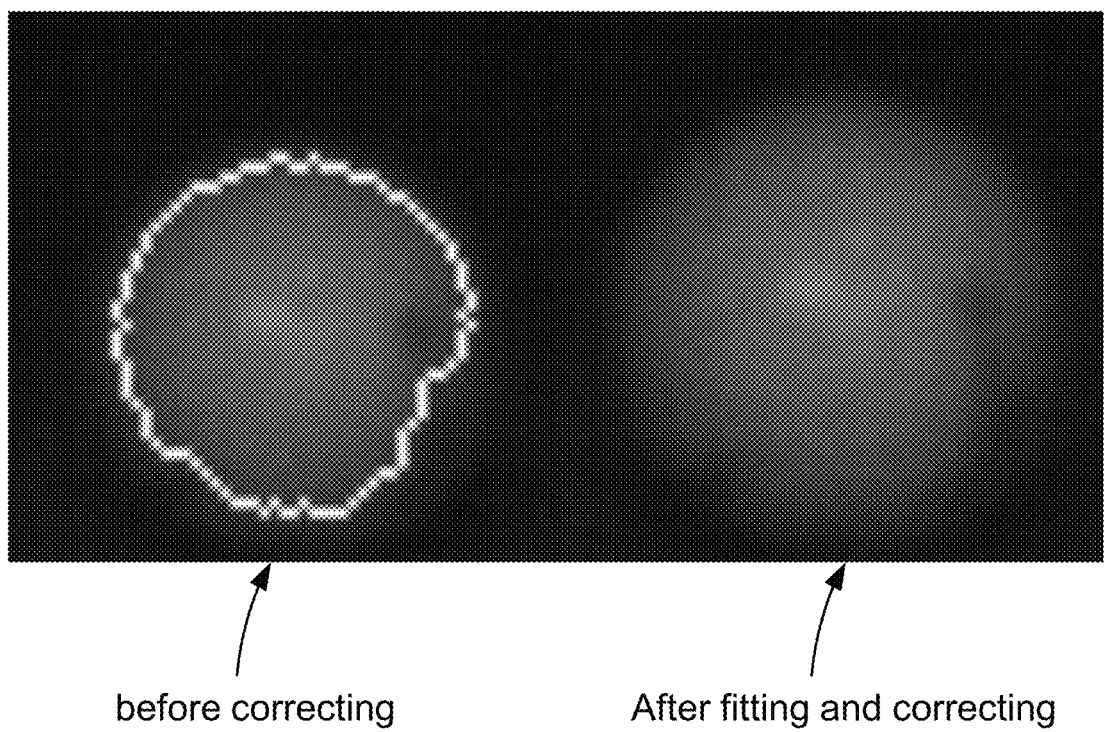
FIG. 9 is a schematic view showing a procedure of fitting and correcting a picture after target screening in the positioning according to the present application.

Due to factors such as shadows, the contour of the golf ball in the target picture of the golf ball is not one complete circle as shown in the left part of FIG. 9 such that the center of the golf ball cannot be positioned in the picture. Therefore, it is necessary to correct the ball contour in the target picture. In the embodiment of the present application, a least square method is used for the fitting and correcting to obtain a complete circular contour of the golf ball. A picture with the fitted and corrected complete ball contour is shown in the right part of FIG. 9.

S405, acquiring a ball center coordinate of the golf ball according to the complete golf ball contour picture.

In a picture with a complete golf ball contour, the center of the ball can be accurately positioned, and then the ball center coordinate of the golf ball can be obtained based on the coordinate of the pixel point.

Figure 10:
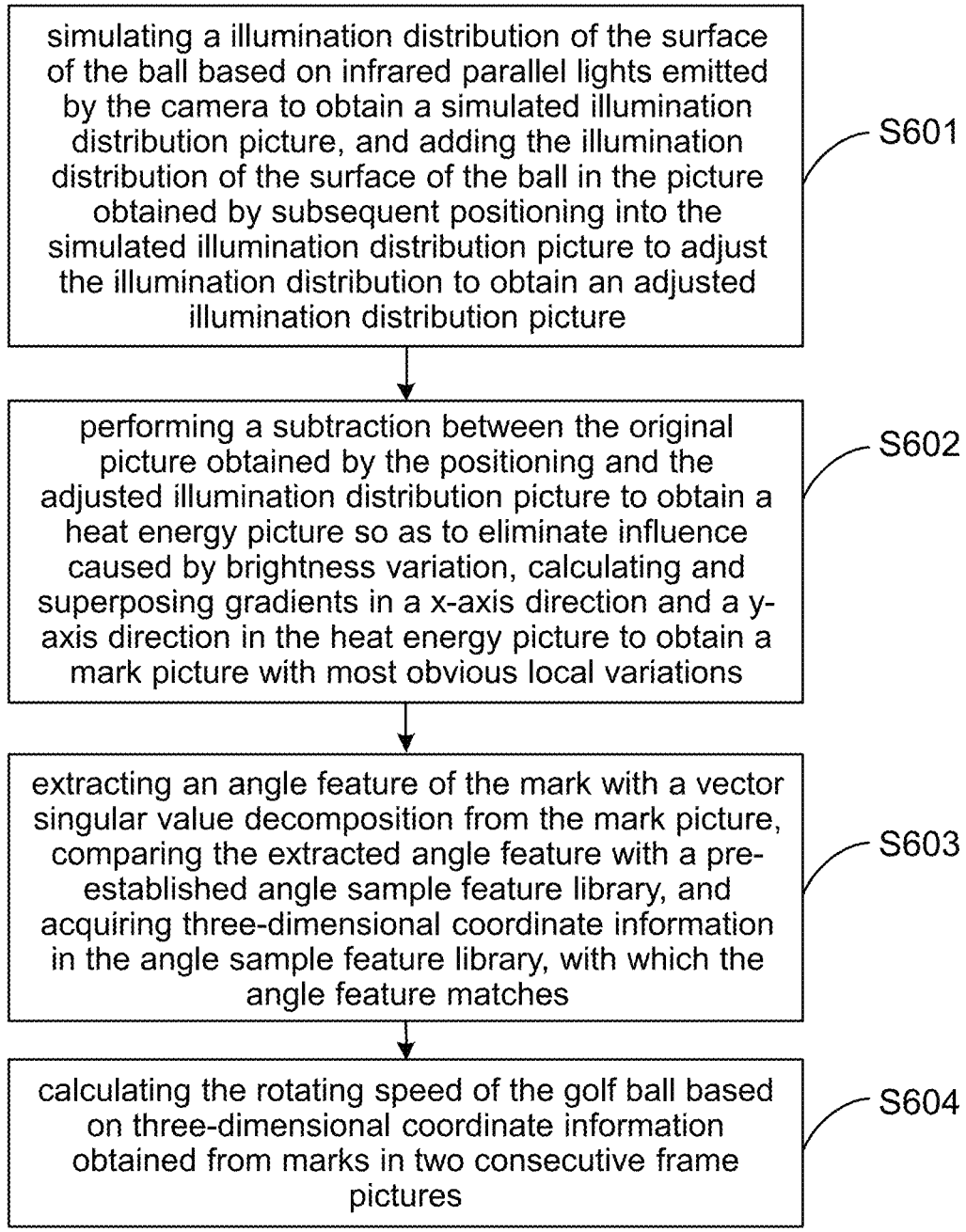
FIG. 10 is a schematic flow diagram of a golf ball rotating speed detection according to the first embodiment of the present application.

Specifically, as shown in FIG. 10, in the present application, extracting a mark on the golf ball in the picture used for positioning by performing a gradient-based dynamic segmentation method, and acquiring the rotating speed based on the angular variation of the extracted mark in the picture specifically includes steps as follows.

S601, simulating a illumination distribution of the surface of the ball based on infrared parallel lights emitted by the camera to obtain a simulated illumination distribution picture, and adding the illumination distribution of the surface of the ball in the picture obtained by subsequent positioning into the simulated illumination distribution picture to adjust illumination distribution to obtain an adjusted illumination distribution picture.

Figure 12:
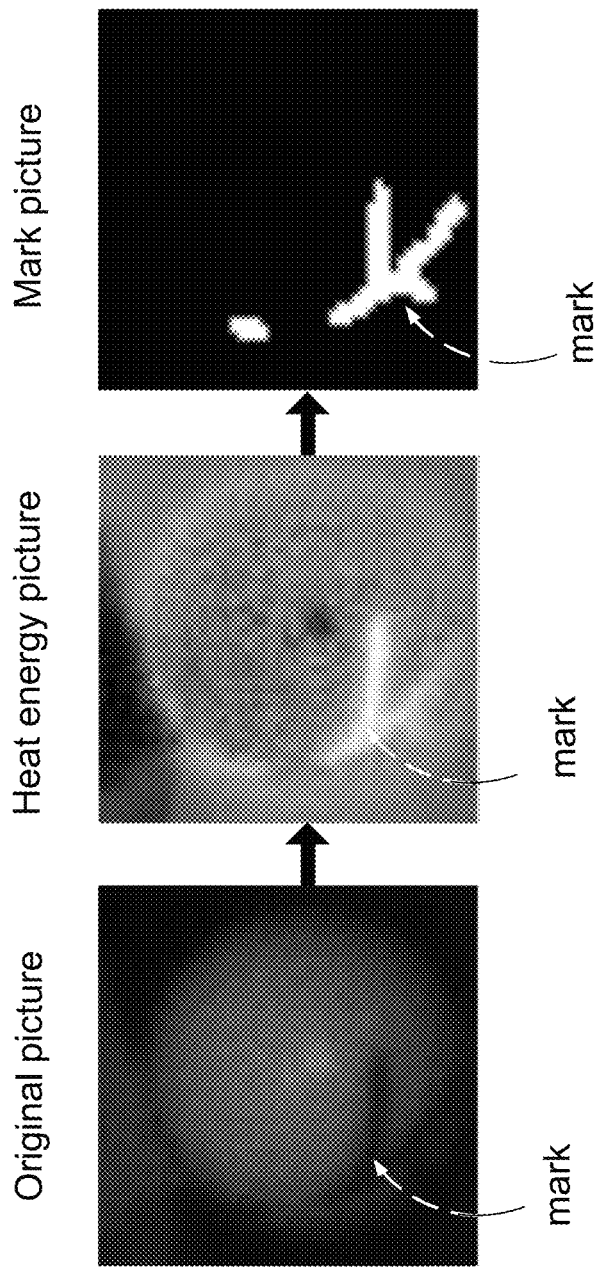
FIG. 12 is a schematic view showing a procedure for obtaining a mark picture in the golf ball rotating speed detection according to the present application.

As shown in the left picture of FIG. 12, in the present application, a mark is arranged in advance on a golf ball such that a mark picture can be obtained according to the mark in the picture.

Figure 11:
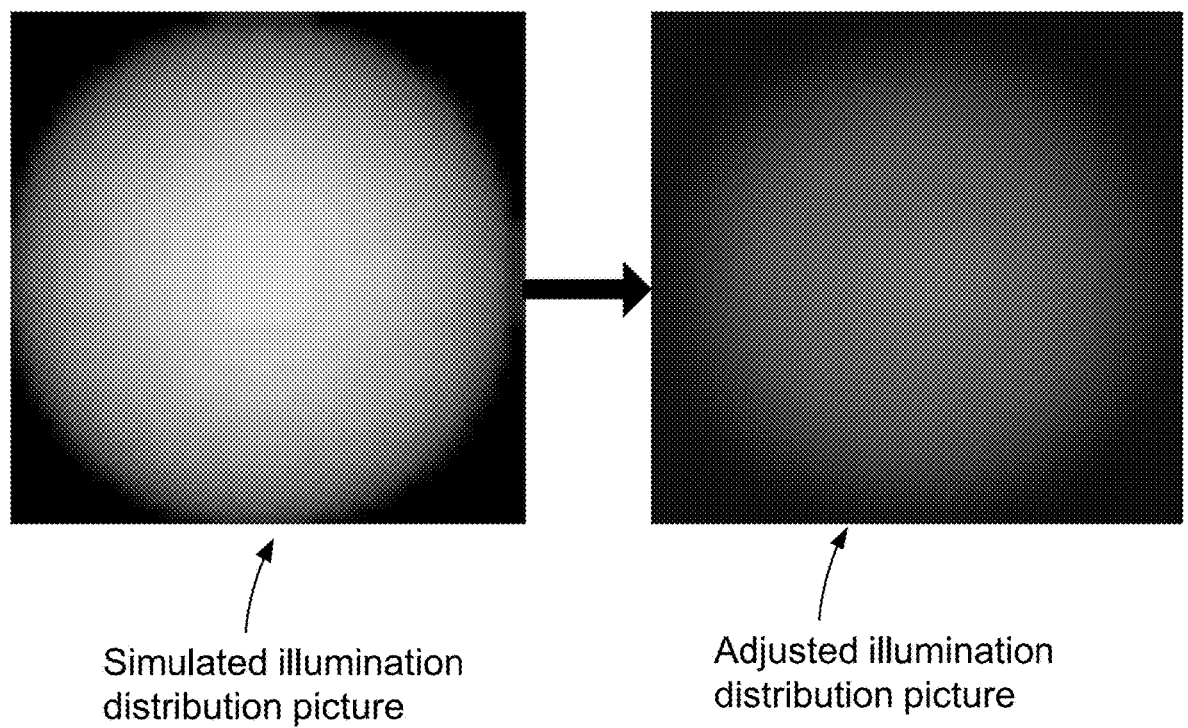
FIG. 11 is a schematic view showing the simulation and adjustment of illumination distribution in golf ball rotating speed detection according to the present application.

As shown on the left of FIG. 11, a simulation distribution of the illumination on the surface of the ball is firstly performed. The simulation distribution is wide in application range, but the distribution effect thereof is poor. Thus, the illumination distribution on the surface of the ball obtained by subsequent positioning is added for adjusting the simulation distribution to obtain the adjusted illumination distribution as shown on the left of FIG. 11, and the optimal illumination distribution effect under the environment can be achieved.

S602, performing a subtraction between the original picture obtained by the positioning and the adjusted illumination distribution picture to obtain a heat energy picture so as to eliminate the influence caused by brightness variation, calculating and superposing gradients in a x-axis direction and a y-axis direction in the heat energy picture to obtain a mark picture with the most obvious local variation.

The brightness distribution of the foreground is uneven, the brightness variation of each frame picture is large, and the resolution ratio of the obtained picture is low. Thus, it is difficult to clearly and accurately obtain the mark on the golf ball with a gray value segmentation. The present application adopts a gradient-based dynamic segmentation method.

As shown in FIG. 12, firstly, a subtraction is performed between the original picture on the left and the adjusted illumination distribution picture to obtain the heat energy picture in the middle. The heat energy picture eliminates the effects caused by brightness variation. Then, gradients in the x-axis direction and the y-axis direction are calculated and superposed in the heat energy picture, i.e. a mark picture with the most obvious local variation on the right is obtained.

S603, extracting an angle feature of the mark with a vector singular value decomposition from the mark picture, comparing the extracted angle feature with a pre-established angle sample feature library, and acquiring three-dimensional coordinate information in the angle sample feature library, with which the angle feature matches.

Singular Value Decomposition (SVD) is used to extract the angle feature of the mark in the mark picture. The angle sample feature library stores various angles of marks on the golf ball, and three-dimensional coordinate information corresponding to various angles. After the angle feature of the mark on the golf ball in the picture is extracted, the angle feature is matched with the angle sample feature library to obtain the corresponding three-dimensional coordinate information.

In one embodiment of the present application, the singular value decomposition (SVD) is used for extracting the angle feature of a mark in the case of a golf ball with a fixed mark. In another embodiment, when the mark on the golf ball is not fixed, the centroid of the mark can be selected as a target point, and the rotating speed can be calculated according to the three-dimensional coordinate corresponding to the surface of the ball of the target point.

S604, calculating the rotating speed of the golf ball based on three-dimensional coordinate information obtained from marks in two consecutive frame pictures.

After the rotating speed of the golf ball is obtained, the rotating state of the golf ball at each point of the track can be simulated by combining the coordinate information obtained by the positioning, and thus the reality of system simulation is improved.

In the golf ball floor type detection method according to embodiment of the present application, by correcting the distortion of the camera and combining with the dynamic segmentation based on fuzzy entropy during the positioning, the picture processing can adapt to the changes in an ambient light and improve the positioning accuracy. Meanwhile, by determining triggering of hitting a ball, after the coordinate of the serving position of the golf ball is obtained, the position monitoring is no longer to be performed. Instead, the pixel variation value at the serving position of the golf ball is monitored in real time. Therefore, replacing coordinate positioning with pixel monitoring can increase the response speed of the golf system. In addition, the mark on the golf ball is extracted by performing a gradient-based dynamic segmentation method in the rotating speed detection procedure such that the mark on the golf ball can be accurately extracted in a low-resolution picture to accurately obtain the angle feature of the golf ball to calculate the rotating speed.

The present application also proposes a golf simulation system including a memory, a processor, and a computer program stored in the memory and configured to be executed by the processor, the processor implementing the method described above when executing the computer program.

Taking an example, the computer program can be segmented into one or more modules/units that are stored in the memory and executed by the processor to perform the present application. The one or more modules/units can be a series of computer program instruction segments, capable of performing specific functions, for describing the executing procedure of the computer program in asynchronous message processing terminal equipment.

A master control module may include, but is not limited to, a processor, and a memory. Those skilled in the art will appreciate that the above-described components are merely examples based on the system and are not to be construed as limiting the master module, and may include more or fewer components than those described above, or may combine certain components, or different components. For example, the master control module may also include the input and output equipment, network access equipment, bus, etc.

The processor may be a central processing unit (CPU) or other general purpose processors, a digital signal processor (DSP), an application specific integrated circuit (ASIC), a field-programmable gate array (FPGA) or other programmable logic devices, discrete gate or transistor logic devices, discrete hardware assembly, etc. A general purpose processor may be a microprocessor, or the processor may be any conventional processor or the like. The processor is the control center of the equipment and connects various portions of the entire master control module using various interfaces and lines.

The memory may be used to store the computer program and/or module. The processor implements various functions of the equipment by running or executing the computer program and/or module stored in the memory and invoking the data stored in the memory. The memory can mainly include a storage program region and a storage data region. The storage program region can store an operating system, an application program (such as a sound playing function, an image playing function, and the like) required by at least one function, and the like; the storage data region may store data (such as the audio data, phone book, and the like) created according to use, etc. In addition, the memory may include high speed random access memory, and may also include non-volatile memory such as a hard disk, an internal storage, a plug-in hard disk, a smart media card (SMC), a secure digital (SD) card, a flash card, at least one disk storage device, a flash memory device, or other volatile solid state storage device.

The present application also proposes a computer-readable storage medium having stored therein a computer program that, when executed, implements the method described above.

The integrated module/unit of the golf ball floor type detection method of the present application may be stored in one computer readable storage medium if implemented in the form of a software functional unit and sold or used as a stand-alone product. The specific implementation mode of the computer readable storage medium of the present application is basically the same as each embodiment described above for the golf ball floor type detection method, and will not be repeated here.

It should be noted that the above-described embodiments are merely illustrative. The units described as separate components may or may not be physically separated, and the components displayed as units may or may not be physical units, that is, they may be located in one place, or they may be distributed on multiple network units. Some or all of the modules can be selected according to actual needs to achieve the purpose of the scheme of the embodiment. In addition, in the drawings of the embodiments provided by the present application, the connecting relationship between modules indicates that there is a communication connection therebetween, which may be specifically implemented as one or more communication buses or signal lines. A person of ordinary skills in the art would understand and practice that without involving any inventive effort.

The above are only examples to clearly illustrate the present application, and do not thereby limit the patent scope of the present application. It is not possible to list all implementation modes here. Under the concept of the present application, any equivalent structural transformation made using the content of the technical solution of the present application, or the direct/indirect application in other related technical fields are included in the patent protection scope of the present application.

What is claimed is:

1. A golf ball floor type detection method, which is applied to a golf system with a camera configured at a side for detecting a golf ball provided with a mark thereon, comprising:
correcting distortion of the camera: correcting a distorted image coordinate system of the camera by performing a polar coordinate transformation;
calibrating the camera: converting the corrected image coordinate system into a world coordinate system;
triggering of hitting a ball: monitoring a pixel variation value of a serving position of a golf ball in a picture captured by the camera in real time, and determining triggering of hitting the ball when the pixel variation value of the position exceeds a threshold value;

positioning the golf ball: processing the picture captured by the camera after triggering of hitting the ball with a dynamic segmentation based on a fuzzy entropy and positioning the processed picture to acquire coordinate data of the golf ball;

calculating parameters: substituting the coordinate data of the golf ball obtained by the positioning into a world coordinate system to calculate movement parameters of the golf ball; and detecting a rotating speed of the golf ball: extracting the mark on the golf ball in the picture used for positioning by performing a gradient-based dynamic segmentation method and acquiring the rotating speed based on angular variation of the extracted mark in the picture.

2. The method according to claim 1, wherein the step of correcting the distorted image coordinate system of the camera by performing the polar coordinate transformation is adapted to a correcting formula below:

$$phi = a\tan 2(y,x);$$

$$DST = L/(r_2 - dst^2)^{0.5} \times dst;$$

where:

$$\operatorname{atan2}(y, x) = \begin{cases} \arctan\left(\frac{y}{x}\right) & x > 0 \\ \arctan\left(\frac{y}{x}\right) + \pi & y \geq 0, x < 0 \\ \arctan\left(\frac{y}{x}\right) - \pi & y < 0, x < 0 \\ +\frac{\pi}{2} & y > 0, x = 0 \\ -\frac{\pi}{2} & y < 0, x = 0 \\ 0 & y = 0, x = 0 \end{cases}$$

phi is a azimuth angle, x and y are coordinates in an image coordinate system, DST and dst respectively are radius lengths of an output plane and an image plane on a polar coordinate system, r is a physical radius length of the lens of the camera, and L is a scaling factor.

3. The method according to claim 1, wherein the step of converting the corrected image coordinate system into a world coordinate system is adapted to a conversion formula below:

$$s \begin{bmatrix} u \\ v \\ 1 \end{bmatrix} = M_1 M_2 \begin{bmatrix} x_w \\ y_w \\ z_w \\ 1 \end{bmatrix} = \begin{bmatrix} m_{11} & m_{12} & m_{13} & m_{14} \\ m_{21} & m_{22} & m_{23} & m_{24} \\ m_{31} & m_{32} & m_{33} & m_{34} \end{bmatrix} \begin{bmatrix} x_w \\ y_w \\ z_w \\ 1 \end{bmatrix} = M \begin{bmatrix} x_w \\ y_w \\ z_w \\ 1 \end{bmatrix},$$

where, $M_1$ is an internal reference matrix of the camera, $M_2$ is an external reference matrix of the camera, $M_1 \times M_2 = M$, and M is a mapping matrix.

4. The method according to claim 1, wherein the step of processing the picture captured by the camera after triggering of hitting ball with the dynamic segmentation based on the fuzzy entropy and positioning the processed picture to acquire coordinate data of the golf ball comprises:

acquiring the picture after triggering of hitting the ball, and removing an interfering background by eliminating a simulated background brightness for the picture;

performing a dynamic segmentation based on the fuzzy entropy on the picture with an interfering background removed to obtain a clear binarized target contour;

performing area, aspect ratio, and brightness screening on the binarized target contour to remove a non-golf-ball target and reserve the golf ball target to obtain a target picture of the golf ball;

fitting and correcting a ball contour in the screened golf ball target picture with a least square method to obtain a complete golf ball contour picture; and acquiring a ball center coordinate of the golf ball according to the complete golf ball contour picture.

5. The method according to claim 1, wherein a segmentation value of the dynamic segmentation based on the fuzzy entropy is calculated based on a formula below:

$$u = \frac{1}{1 + \frac{|v-m|}{255}}; \text{entropy} = \frac{u}{\log_{10}(u)} - \frac{1-u}{\log_{10}(1-u)};$$

wherein u is a degree of membership, m is a feature value based on a gray value, v is a pixel value, and entropy is the fuzzy entropy;

wherein pixels in a range of pixels conforming to the above formula are respectively substituted into the above formula to solve the fuzzy entropy of a foreground and a background, and a minimum value is selected as an optimal segmentation value.

6. The method according to claim 1, wherein the step of extracting the mark on the golf ball in the picture used for positioning by performing the gradient-based dynamic segmentation method and acquiring the rotating speed based on angular variation of the extracted mark in the picture comprises:

simulating a illumination distribution of the surface of the ball based on infrared parallel lights emitted by the camera to obtain a simulated illumination distribution picture, and adding the illumination distribution of the surface of the ball in the picture obtained by subsequent positioning into the simulated illumination distribution picture to adjust the illumination distribution to obtain an adjusted illumination distribution picture;

performing a subtraction between the original picture obtained by the positioning and the adjusted illumination distribution picture to obtain a heat energy picture so as to eliminate influence caused by brightness variation, calculating and superposing gradients in a x-axis direction and a y-axis direction in the heat energy picture to obtain a mark picture with most obvious local variations;

extracting an angle feature of the mark with a vector singular value decomposition from the mark picture, comparing the extracted angle feature with a pre-established angle sample feature library, and acquiring three-dimensional coordinate information in the angle sample feature library, with which the angle feature matches; and calculating the rotating speed of the golf ball based on three-dimensional coordinate information obtained from marks in two consecutive frame pictures.

7. A golf simulation system, wherein the golf simulation system comprises a memory, a processor, and a computer program stored in the memory and configured to be executed by the processor, wherein the processor is configured to execute the computer program for implementing the method of claim 1.

8. A non-temporary computer-readable storage medium, wherein the non-temporary computer-readable storage medium stores a computer program thereon, wherein, the computer program is executable to implement the method of claim 1.

* * * * *